March 10, 1970 H. D. FETTEROLF ET AL 3,499,215

CAPACITIVE FIXED MEMORY SYSTEM

Original Filed Sept. 3, 1964 2 Sheets-Sheet 1

INVENTORS
HARRY D. FETTEROLF
BEUFORD E. TINDAL
BY

Ronald W. O'Keefe

CAPACITIVE FIXED MEMORY SYSTEM

Original Filed Sept. 3, 1964 2 Sheets-Sheet 2

INVENTORS
HARRY D. FETTEROLF
BEUFORD E. TINDAL
BY
Ronald W. O'Keefe

United States Patent Office 3,499,215
Patented Mar. 10, 1970

3,499,215

CAPACITIVE FIXED MEMORY SYSTEM

Harry D. Fetterolf, Syracuse, N.Y., and Beuford E. Tindal, Phoenix, Ariz., assignors to General Electric Company, a corporation of New York Original application Sept. 3, 1964, Ser. No. 394,241, now abandoned. Divided and this application May 5, 1967, Ser. No. 636,307
Int. Cl. H01f 7/05
U.S. Cl. 29—604 3 Claims

ABSTRACT OF THE DISCLOSURE

A method of fabricating a capacitive memory structure which employs capacitive coupling elements formed in holes in an insulative panel, the capacitive elements of which are selectively connected to conductors arranged on opposite sides of the panel.

This invention relates to memories and, in particular, to fixed memories utilizing capacitive elements and to a method for producing the same.

This application is a division of application, Ser. No. 394,241, filed Sept. 3, 1964, now abandoned, and entitled "Capacitive Fixed Memory System."

In fixed memories utilizing capacitive elements as permanent storage devices for binary digits, the presence or absence of capacitive coupling between a sense and a drive conductor determines whether a binary 1 or a binary 0 is stored at the location in the memory defined by the drive and the sense conductors. The utilization of capacitive elements permits high speed addressing and read-out of data from the memory array. Existing capacitive fixed memory systems do not employ to the maximum extent the high speed capabilities of a capacitive memory. In addition, presently available capacitive fixed memories are difficult and expensive to fabricate.

Accordingly, it is an object of the invention to provide an improved capacitive fixed memory system.

It is another object of the invention to provide an improved capacitive element for use in a fixed memory system.

It is another object of the invention to provide a capacitive fixed memory system capable of extremely high speed operation.

It is another object of the invention to provide an easily fabricated capacitive fixed memory system adapted to automated manufacturing techniques.

It is a further object of the invention to provide a method for fabricating such an improved capacitive element and capacitive fixed memory system.

Briefly stated, in accordance with the illustrated embodiment of the invention, a capacitive fixed memory is provided employing an insulative panel having a first set of spaced grooves formed in one side of the panel. A plurality of holes are formed to extend through the insulative panel, each hole intersecting a predetermined groove. Coatings of conductive material are deposited on the walls of the grooves to form signal conductors. Coatings of conductive material, electrically connected to the coatings on the walls of the respective grooves, are also deposited on the walls of the holes. The conductive coating on the walls of each hole terminates a predetermined distance from the end of the hole on the side of the panel opposite the first set of grooves so that the end portion of each hole is devoid of conductive material.

A second set of spaced grooves, transverse to the first set, is formed in the opposite side of the insulative panel, each groove of the second set intersecting a predetermined hole at the end portion which is devoid of conductive material. The walls of the first set of grooves and of the holes are coated with a thin layer of insulating material. Additional coatings of conductive material are deposited on the walls of the second set of grooves and on the walls of the holes. The coatings on the walls of the second set of grooves are electrically connected to the second coatings on the walls of the respective holes and form signal conductors.

The two coatings of conductive material, separated by the thin layer of insulating material, on the walls of each of the holes comprise the plates of a capacitor. Capacitive coupling between the transverse signal conductors in the grooves which intersect a given hole on opposite sides of the panel is thereby provided to represent the storage of a binary 1. Capacitive coupling between a given pair of transverse signal conductors can be eliminated, to indicate storage of a binary 0, by severing the electrical connection between the signal conductor in one of the grooves and the corresponding coating in the respective hole.

The subject matter of the present invention is particularly pointed out and distinctly claimed in the concluding portion of the specification. The invention, however, both as to organization and method of operation may best be understood by reference to the following description taken in connection with the accompanying drawings, in which:

Figure 1:
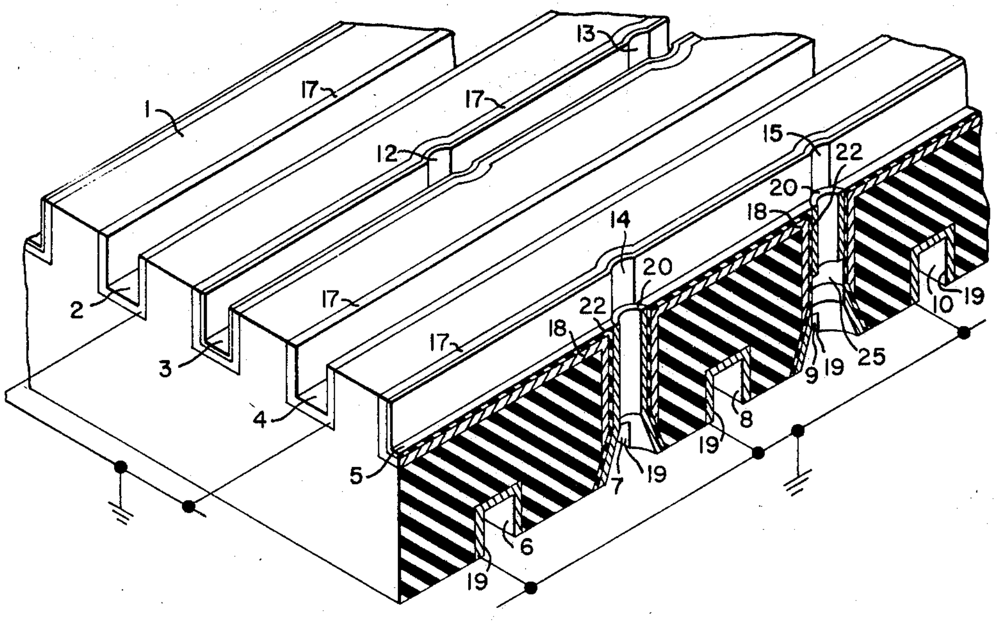
FIG. 1 is a sectional perspective view illustrating an embodiment of a capacitive fixed memory constructed in accordance with the present invention.

With reference to FIG. 1, the embodiment of the invention chosen for illustration employs a sheet or panel 1 of insulative material having a plurality of spaced grooves 2, 3, 4 and 5 formed in one side of the panel and a plurality of spaced grooves 6, 7, 8, 9 and 10 formed in the other side of the panel. Panel 1, normally of predetermined and uniform thickness, may be fabricated from any suitable insulating material, such as epoxy paper sheet, and may be curved or planar depending upon application requirments.

Grooves 2–5 are arranged to be non-intersecting and may be, for example, parallel to each other. Grooves 6–10 are similarly non-intersecting and are transverse to grooves 2–5. The grooves may be formed in panel 1 by various methods, such as chemical etching, machining or molding.

Holes 12, 13, 14 and 15 are provided at the points where alternate grooves on opposite sides of the panel cross each other. Holes 12–15 extend through panel 1 and the axes of the holes may be substantially perpendicular to the plane of panel 1. Rows of spaced holes are thereby provided along alternate grooves on opposite sides of the panel. In the illustrated embodiment, holes 12 and 13 and holes 14 and 15 intersect alternate grooves 3 and 5 respectively on one side of panel 1. Similarly, holes 12 and 14 and holes 13 and 15 intersect alternate grooves 7 and 9 respectively on the opposite side of panel 1.

Conductors are provided in grooves 2–5 and 6–10 in the form of conductive coatings 17 and 19 respectively deposited on the walls of the grooves. In holes 12–15, there are provided first and second coaintgs 18 and 20 respectively of conductive material, coatings 18 and 20 being insulated from each other by layers 22 of insulating material. The first coatings 18 of conductive material in holes 12–15 are electrically connected to the respective conductors in the intersecting grooves on one side of panel 1. For example, coating 18 of conductive material in hole 14 is electrically connected to the conductor in groove 5. The second coatings 20 of conductive material in the holes are electrically connected to the respective conductors in the intersecting grooves on the opposite side of the panel. Thus, coating 20 in hole 14 is connected to the conductor in groove 7.

The first and second coatings of conductive material, separated by the insulating layers, on the walls of holes 12–15 serve as the plates of capacitors to provide permanent data storage. The conductors formed in grooves 3, 5, 7 and 9 serve as signal conductors to enable application of signals to or derivation of signals from the associated capacitor plates on the walls of holes 12–15. For example, coatings 18 and 20 of conductive material, separated by insulating layer 22, on the walls of hole 14 are connected to the conductive coatings in grooves 5 and 7, respectively, to provide capacitive coupling between the signal conductors in grooves 5 and 7. This capacitive coupling represents storage of a binary 1.

When it is required that no signal be capacitively coupled between a given pair of transverse signal conductors on opposite sides of panel 1, to indicate the storage of a binary 0, the electrical connection between the second coating of conductive material on the walls of the corresponding intersecting hole and the associated signal conductor is broken. For example, the capacitive coupling between the signal conductors in grooves 5 and 9 is eliminated by removing a portion of the coating 20 of conductive material in hole 15 so as to sever the electrical connection between coating 20 in hole 15 and the signal conductor in groove 9, as illustrated at 25 in FIG. 1. Alternatively, the hole connecting the signal conductors can be dispensed with in initially forming the signal conductor and hole pattern to preclude signal coupling between a given pair of transverse signal conductors on opposite sides of panel 1, to thereby indicate the storage of a binary 0.

The signal conductors on either side of the panel may serve as drive conductors in the capacitive fixed memory system of the invention, with the signal conductors on the opposite side of the panel serving as sense conductors. For example, the signal conductors in grooves 3 and 5 may be employed as drive conductors and the signal conductors in grooves 7 and 9 as sense conductors. The value of capacitance provided between selected signal conductors on opposite sides of panel 1 may be initially adjusted by controlling the dimensions of the holes, the thickness of the layer of insulating material, and the dielectric constant of the insulating material. Capacitances in the order of 1–10 pf. are attainable in the capacitive fixed memory of the invention. Extremely high speed operation of the fixed memory, for example cycle times in the order of 100 nanoseconds, is possible due to these low values of capacitance and the shielding of the signal conductors.

The conductors formed by the conductive coatings in grooves 2, 4, 6, 8 and 10 may be electrically interconnected and connected to ground, as illustrated, or to any other suitable reference potential to provide a shield for the signal conductors in grooves 3, 5, 7 and 9. Since each of the signal conductors, for example, the conductor in groove 3, is surrounded on two sides and partially surrounded on a third side by ground conductors, the structure approaches the configuration of a coaxial transmission line. This structure greatly improves the high frequency transmission characteristic of the signal conductors and is particularly effective in minimizing noise due to cross-coupling between signal conductors.

Although only four capacitive elements are illustrated in FIG. 1, an array having any desired number of elements of the type illustrated may be formed to provide a capacitive fixed memory system of a predetermined storage capacity.

Figure 2:
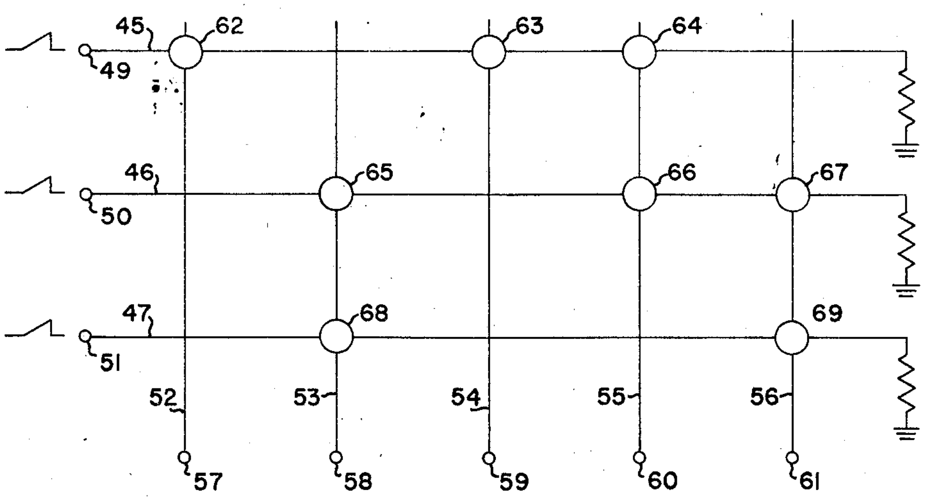
FIG. 2 is a schematic drawing of a capacitive fixed memory system constructed in accordance with the invention and illustrating a typical memory array.

With reference to FIG. 2, a capacitive fixed memory system, in accordance with the invention, is shown schematically to simplify description of the system operation. For convenience, the drive and sense conductors on the insulative panel are illustrated merely as lines. The capacitive couplings, formed at the intersections of drive and sense conductors on opposite sides of the panel by the conductive coatings deposited on the walls of the holes, are indicated by circles. The absence of a circle at an intersection of drive and sense conductors indicates that the capacitive coupling has been eliminated.

A plurality of drive conductors 45, 46 and 47, formed on one side of an insulative panel, are connected to corresponding input terminals 49, 50 and 51 respectively. Input terminals 49–51 are connected to any convenient read pulse source to provide input signal pulses, as indicated, to each of the input terminals.

A plurality of signal conductors 52, 53, 54, 55 and 56, which serve as sense conductors, are provided on the opposite side of the insulative panel and are arranged transverse to conductors 45–47. Signal conductors 52–56 are connected to corresponding output terminals 57, 58, 59, 60 and 61. Each intersection of a drive conductor and a sense conductor represents a binary digit in the memory, the storage of a binary 1 being effected by the provision of capacitive coupling between the drive and sense conductors and the storage of a binary 0 being effected by the absence of a capacitive coupling between the drive and sense conductors at their intersection. Thus, the simple capacitive fixed memory array illustrate schematically in FIG. 2 has a capacity of three binary words each comprising five binary digits.

In operation, upon application of a read pulse to terminal 49 and drive conductor 45, signals will be coupled to sense conductors 52, 54 and 55 due to capacitive couplings 62, 63 and 64 respectively. No signals appear on sense conductors 53 and 56. Thus, application of a read pulse to drive conductor 45 indicates that the stored information in the top row of the matrix is a binary word comprising the binary digits 10110.

Similarly, upon application of a read pulse to input terminal 50 and drive conductor 46, capacitive couplings 65, 66 and 67 provides output pulses on sense conductors 53, 55 and 56 respectively. The binary word represented by the positions of the capacitive couplings on drive conductor 46 is 01011. Capacitive couplings 68 and 69 on drive conductor 47 provide output pulses on sense conductors 53 and 56 respectively upon application of a read pulse to input terminal 51 and drive conductor 47. The resulting binary word at output terminals 57–61 is thus 01001.

Figure 3:
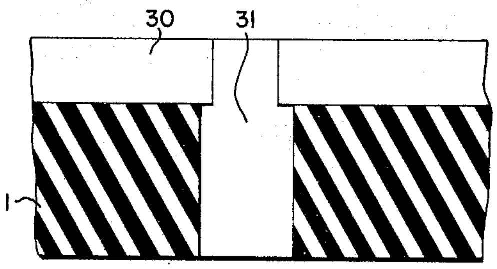
FIGS. 3–8 are edge sectional views illustrating the steps of the method employed to fabricate the capacitive fixed memory of FIG. 1, in accordance with the invention.
Figure 4:
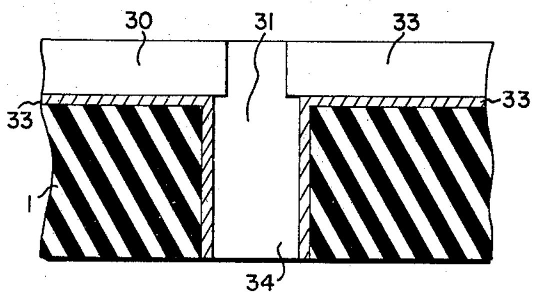

In fabricating the capacitive fixed memory element of the invention for use in a fixed memory system of the type illustrated in FIG. 1, the grooves in one side of insulative panel 1 and the holes extending through the panel are first formed, as shown in FIG. 3. Reference numeral 30 indicates a groove in the upper side of panel 1 while reference numeral 31 indicates a hole formed in panel 1 which intersects groove 30. In the next step in the method of fabricating the capacitive fixed memory element of the invention, illustrated in FIG. 4, a coating 33 of conductive material is deposited on the bottom and side walls of groove 30. A similar coating 34 is deposited on the walls of hole 31. The coating on the walls of the hole and the coating on the walls of the groove are preferably deposited simultaneously to provide a continuous layer of conductive material, free of ohmic junctures, between the hole and the groove.

Figure 5:
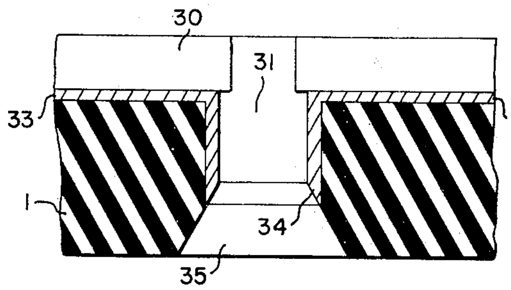
Figure 6:
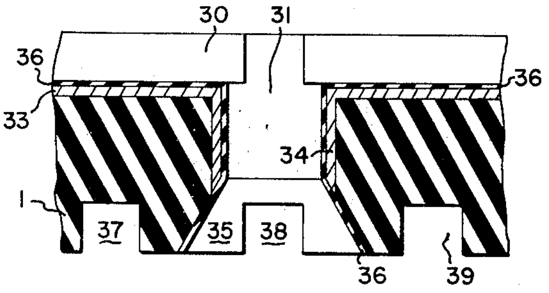

In the next step of the method, illustrated in FIG. 5, the end of the coated hole 31 on the side of panel 1 opposite groove 30 is countersunk, as shown at 35, to remove a portion of the conductive material 34. Alternatively, the conductive material can be removed by reaming the lower portion of the hole or by any other suitable means. As shown in FIG. 6, the walls of groove 30 and hole 31 are next coated with a layer of insulating material 36 and grooves are formed transverse to groove 30 in the opposite side of panel 1, as indicated by reference numerals 37, 38 and 39. Groove 38 is formed to intersect hole 31 in the countersunk area 35 so as not to intersect conductive coating 34.

Figure 7:
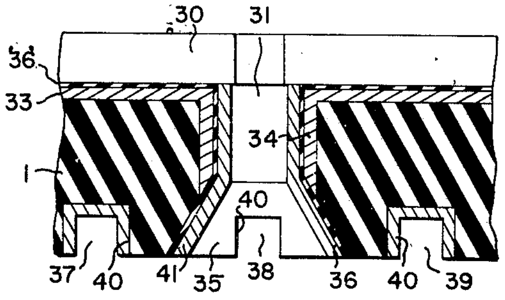
Figure 8:
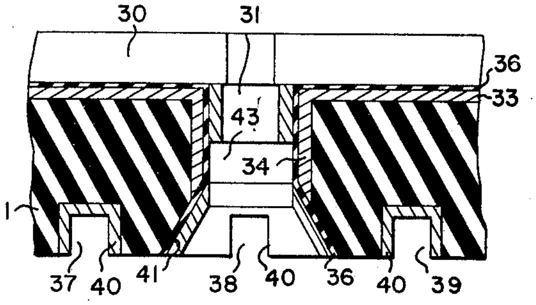

In the next step of the method, a coating of conductive material 40 is deposited on the walls of grooves 37–39 and a second coating of conductive material 41 is deposited on the walls of hole 31 including the countersunk area, as illustrated in FIG. 7. Conductive coatings 34 and 41 on the walls of hole 31 are separated by insulating layer 36 and, as previously described, form a capacitive coupling, representing a binary 1, between the signal conductors provided by the conductive coatings 33 and 40 on the walls of grooves 30 and 38 respectively. This capacitive coupling may be eliminated to represent the storage of a binary 0 by removing a portion of the conductive coating 41 on the walls of hole 31 so as to electrically separate the conductive coating 40 on the walls of groove 38 from the conducting coating 41 on the walls of hole 31, as illustrated at 43 in FIG. 8. This removal of conductive material may be accomplished by any suitable means, such as drilling. The above-described method readily lends itself to automated fabrication techniques resulting in lower cost and ease of manufacture.

While the principles of the invention have been made clear in an illustrative embodiment, there will be immediately obvious to those skilled in the art many modifications in structure, arrangement, proportions, elements, materials, and components used in the practice of the invention which are particularly adapted for specific environments and operating requirements, without departing from these principles. The appended claims are therefore intended to cover and embrace any such modifications, within the limits only of the true spirit and scope of the invention.

What is claimed as new and desired to be secured by Letters Patent of the United States is:

1. A method for fabricating a capacitive memory element including the steps of: forming a first groove in one side of an insulative panel, forming a hole extending through said insulative panel and intersecting said first groove, depositing a first coating of conductive material on the walls of said first groove and said hole, removing a portion of said first coating of conductive material from the walls of said hole at the end of said hole on the side of said panel opposite said first groove, forming a second groove in the side of said panel opposite said first groove, said second groove intersecting the portion of said hole from which said conductive material was removed, depositing a layer of insulating material over said first coating of conductive material in said hole, and depositing a second coating of conductive material over said layer of insulating material in said hole and on the walls of said second groove, said first and said second coatings of conductive material in said hole with said layer of insulating material therebetween forming a capacitive coupling between the coatings of conductive material on the walls of said first and said second grooves.

2. A method for fabricating a capacitive fixed memory system including the steps of: forming a first set of spaced grooves in one side of an insulative panel, forming a plurality of spaced holes extending through said panel and intersecting selected ones of said grooves, depositing a first coating of conductive material on the walls of each of said grooves of said first set and on the walls of each of said holes, removing a portion of said first coating of conductive material from the walls of each of said holes at the ends of the holes on the side of said insulative panel opposite said first set of grooves, forming a second set of spaced grooves transverse to said first set in the side of said panel opposite said first set, selected grooves of said second set intersecting predetermined ones of said holes at the portions of said holes from which said first coating of conductive material was removed, depositing a layer of insulating material over said first coating of conductive material in each of said holes, and depositing a second coating of conductive material on the walls of each of said grooves of said second set and over said layer of said insulating material in each of said holes, said first and said second coatings of conductive material in each of said holes with said layer of insulating material therebetween forming a capacitive coupling between the coatings of conductive material on the walls of the respective intersecting grooves of said first and said second sets.

3. The method of claim 2 which includes the step of removing portions of said second coatings of conductive material from selected ones of said holes to separate said second coatings of conductive material in said holes from said coatings of conductive material on the walls of said intersecting grooves of said second set to eliminate the capacitive couplings between the coatings of conductive material on the walls of the respective grooves of said first and said second sets which intersect said selected ones of said holes.

References Cited

UNITED STATES PATENTS

| | | | |
|---|---|---|---|
| 920,614 | 5/1909 | McBerty. | |
| 3,042,591 | 7/1962 | Cado | 174—68.5 X |
| 3,142,112 | 7/1964 | Burkig et al. | 29—604 X |
| 3,191,098 | 6/1965 | Fuller | 317—101 |
| 3,226,802 | 1/1966 | Goodwin et al. | 29—604 X |
| 3,293,353 | 3/1964 | Hendriks et al. | 174—68.5 X |

JOHN F. CAMPBELL, Primary Examiner

D. C. REILER, Assistant Examiner